June 1, 1926.
H. S. NICHOLSON
FLEXIBLE COUPLING
Filed August 3, 1925   2 Sheets-Sheet 1
1,587,403
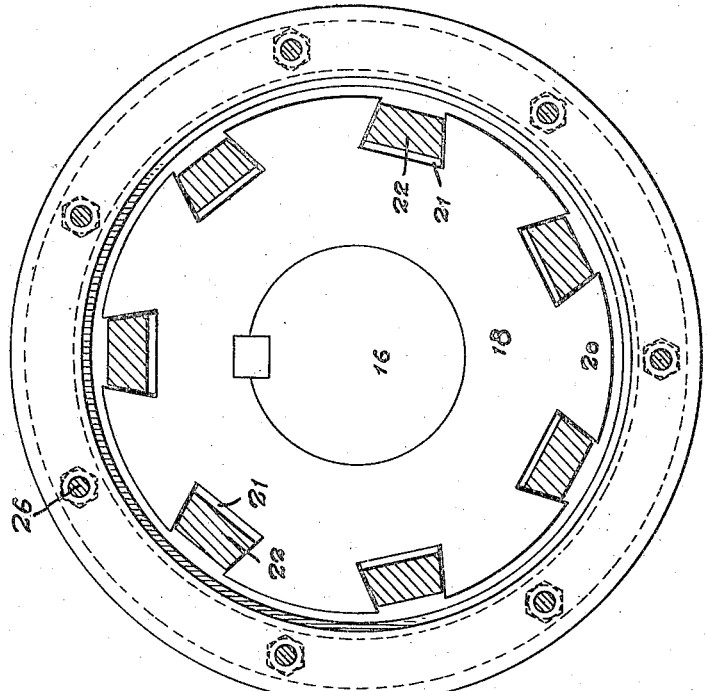
Fig. 2.
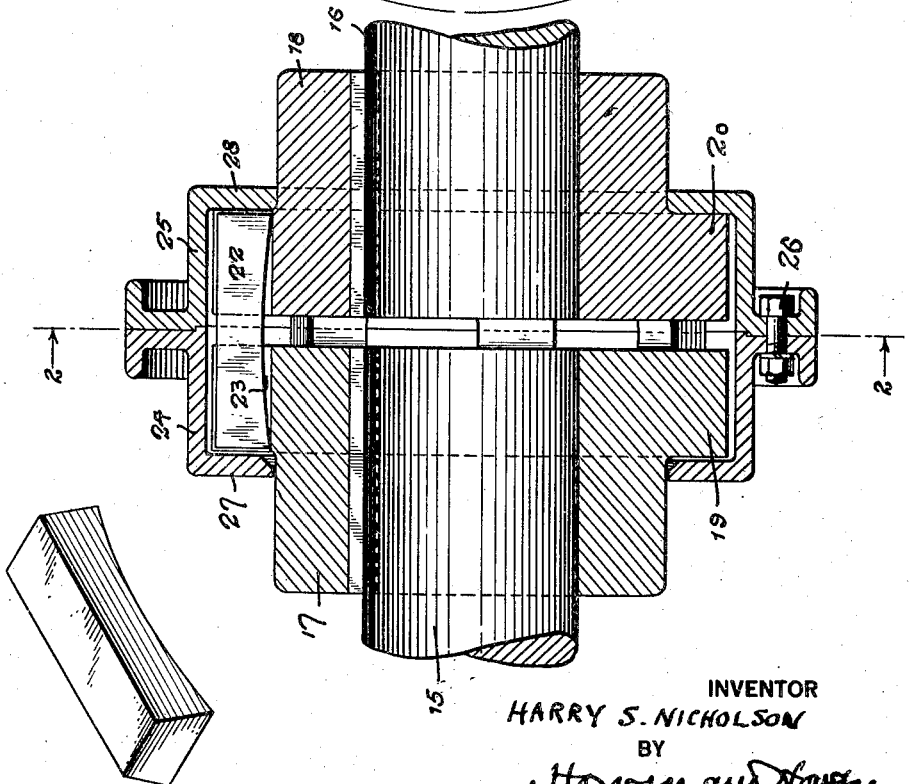
Fig. 1.
Fig. 3.
INVENTOR
HARRY S. NICHOLSON
BY
Howson and Howson
ATTORNEYS

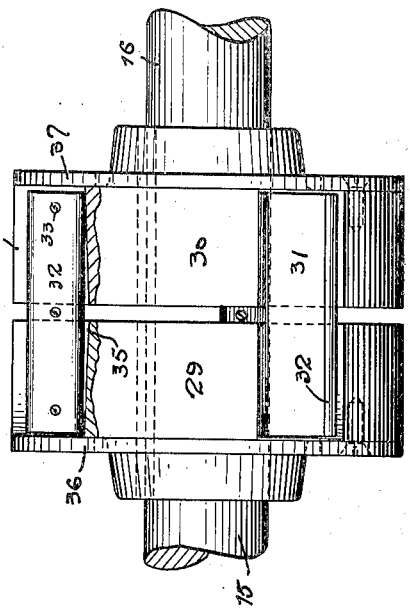
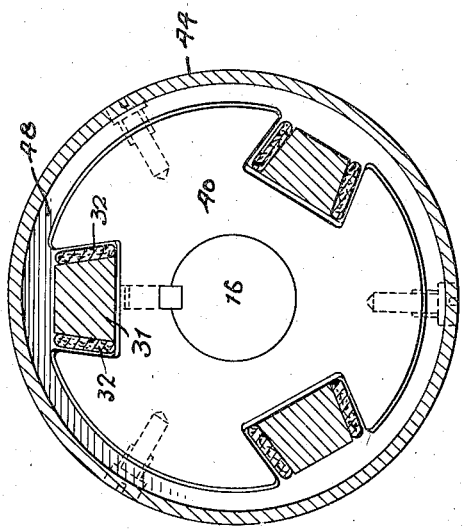
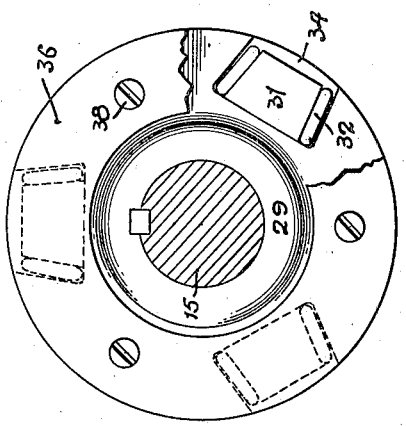
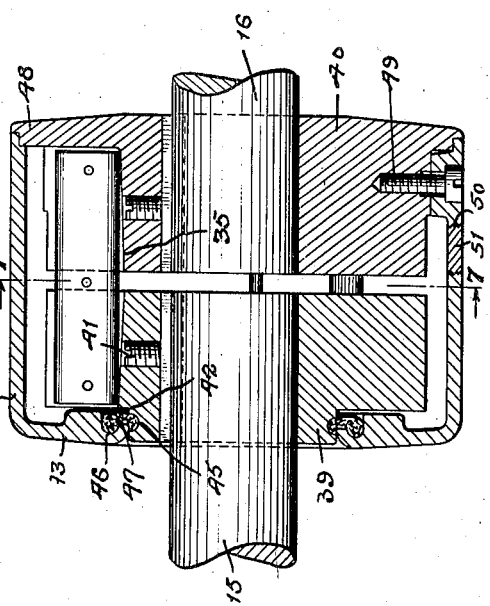

Patented June 1, 1926.

1,587,403

UNITED STATES PATENT OFFICE.

HARRY S. NICHOLSON, OF WILKES-BARRE, PENNSYLVANIA, ASSIGNOR TO W. H. NICHOLSON & COMPANY, OF WILKES-BARRE, PENNSYLVANIA, A CORPORATION OF PENNSYLVANIA.

FLEXIBLE COUPLING.

Application filed August 3, 1925. Serial No. 47,846.

My invention relates to couplings, and more specifically to flexible couplings. Among the particular objects of my invention may be mentioned—(1) a coupling in which the coupling blocks have a take-up movement under the influence of centrifugal force, which prevents chattering between the parts on variation of load stresses; (2) a coupling of this type in which the coupling blocks are effective to establish a drive between members slightly out of axial alignment; (3) coupling blocks provided with lateral wear pads; (4) a coupling provided with a practicable lubrication housing; (5) certain features of structural detail hereinafter described or shown in the accompanying drawings, in which—

Fig. 1 is a vertical section through a coupling in which my invention is embodied in one form;

Fig. 2 is a section on the line 2—2, Fig. 1;

Fig. 3 is a perspective view of one of the coupling blocks, without an attached wear pad;

Fig. 4 is a broken end elevation of a modified construction;

Fig. 5 is a broken side elevation of the same;

Fig. 6 is a longitudinal section through a further modified construction; and

Fig. 7 is a section on the line 7—7, Fig. 6.

In the construction shown in Figs. 1-3, the driving shaft 15 and the driven shaft 16 have keyed to their adjacent ends, driving heads 17 and 18. At their adjacent ends, each head has a peripheral flange 19—20, and in these are aligned, undercut or dovetail peripheral recesses 21 of any appropriate number, equally spaced and preferably odd in number—such as seven—as shown. Arranged in these recesses and spanning the flanges 19—20 are floating, wedge-shaped coupling blocks 22, having dimensions and physical structure sufficiently rugged to effect the drive of the shaft 16 and its load from the shaft 15. The short diameter of the coupling blocks 22 is such that the blocks float in the recesses 21, and consequently radial play therein is possible under the action of centrifugal force. Consequently when the shaft 15 and 16 are rotated, the blocks 22 are thrown outward by centrifugal force and wedge between the oppositely inclined faces of the recesses 21. When the load is thrown upon the shaft 16, however, the thrust of the opposite surfaces of the slots 21 in the driving and driven heads upon the inclined sides of the blocks is sufficient to force the latter inward in the slots 21. As the load is relieved, the centrifugal effort upon the blocks becomes sufficient to cause them to move outward in the recesses and maintain the driving connection. Constant engagement between the opposite sides of the blocks and the bearing faces of the recesses in the driving and driven heads 17 and 18 is thus assured, with the result that no chattering or noise caused by the looseness of the coupling blocks, occurs. A silent drive connection is thus obtained regardless of fluctation in the load.

The inner face 23 (Fig. 1) of each block is preferably concave to permit the block to maintain a normal position with its longitudinal axis in parallelism with the shaft axes when the shafts 15 and 16 are slightly out of axial alinement—due for instance to the settling of the foundations of either the motor or the driven member, or some inaccuracy of location of the shaft bearings.

Surrounding the coupling is a two-piece housing 24—25 which encloses the peripheral flanges 19 and 20 of the collars 17 and 18, and prevents the escape of lubricant. In the form shown this housing comprises a pair of cup rings, having at their adjacent marginal flanges apertured in register to receive the securing bolts 26 by which they are united. The member 25 may, if desired, be rigid with the collar 18 of the driven shaft, or it may have a free bearing thereon if preferred. When connected together, the sides 27 and 28 of the housing rings 24 and 25 prevent the longitudinal escape of the coupling blocks 22 from the undercut recesses 21 in which they are thus retained, with freedom, however, for radial play.

The housing rings 24 and 25 are readily separable by removing the bolts 26. When so separated, the coupling blocks are readily accessible for inspection and replacement.

In the construction shown in Figs. 4 and 5, the driving heads 29 and 30 are of the same general type, but are provided with fewer recesses, only three being shown. The coupling blocks 31 are here provided with pads 32 on their opposite sides to cushion the shearing strains. These pads may be of any suitable material, such as "raybestos", leather, fiber, brass or the like, and are secured to the block by countersunk screws 33. In this construction the inner face of the block 31 is straight, and the accommodation of the coupling blocks to slight axial misalignment of the shafts 15 and 16 is effected by beveling the bottoms of the recesses 34 as indicated at 35. In some instances lubrication of the coupling is unnecessary, and in such case flat retaining rings 36 and 37 may be secured to the outer faces of the coupling heads by screws 38, to prevent the endwise escape of the coupling blocks from the channels 34.

Still another modification is shown in Figs. 6 and 7. In this construction the coupling heads 39 and 40 are modified in form to cooperate with a different type of housing. They are also provided with tapped holes to receive set screws 41 by which the driving heads are held against longitudinal displacement on the shafts 15 and 16. The head 39 is shouldered at 42 to form an abutment for the end flange 43 of the cup-shaped housing 44. It is also channeled at 45 to receive the packing 46 engaged in the channel 47 at the inner margin of the end flange 43 of the housing. The driven head 40 is provided with a peripheral flange 48 shouldered to receive the margin of the housing 44 which thus forms, with the flange 48, a complete enclosure for the coupling blocks. The housing may be secured to the head 40 by screws 49, and the peripheral wall of the housing may be bored and tapped at 50 to form an opening for the introduction of lubricant. A screw plug 51 normally closes this opening.

The constructions shown in Figs. 4 to 7 inclusive, operate in the same manner as that shown in Figs. 1 to 3, and illustrate merely some of the various ways in which my invention may be embodied in a practical manner. The cushioning pads 32 may be used in any of the constructions, and the housing, in any form, may be used or omitted, as circumstances may require, provided some means are utilized to prevent the escape of the coupling blocks from their recesses in the driving heads. With the understanding that the features shown in the several modifications are interchangeable, and that various other modifications may readily be made by those dealing with the problem, without departing from what I claim as my invention,

I claim—

1. A coupling device comprising substantially co-axial driving and driven members recessed to afford substantially aligned channels, and coupling blocks loosely fitting in said channels, said blocks having an outward movement under the influence of centrifugal force, and said channels and blocks having complementary bevelled engaging faces to effect the inward displacement of the blocks under the thrust of load, whereby chattering of the blocks in the channels incident to variation in load is eliminated.

2. A coupling device comprising substantially co-axial driving and driven members recessed to afford substantially aligned bevelled undercuts and wedge shaped coupling blocks loosely fitting in said undercuts with their wedge faces substantially parallel to the bevelled faces of the undercuts in the driving and driven members, said blocks having an outward movement under the influence of centrifugal force, and an inward displacement under the stress of load exerted upon opposite faces thereof by the driving and driven members, whereby chattering of the blocks in the undercuts incident to variation in load is eliminated.

In testimony whereof I have signed my name to this specification.

HARRY S. NICHOLSON.